United States Patent
Fischer et al.

(10) Patent No.: US 9,630,636 B2
(45) Date of Patent: Apr. 25, 2017

(54) DIAGNOSTIC METHOD FOR RAIL VEHICLES

(71) Applicant: SIEMENS AKTIENGESELLSCHAFT, Munich (DE)

(72) Inventors: Erhard Fischer, Fuerth (DE); Thomas Mueller, Roethenbach/Pegnitz (DE); Frank Popp, Fuerth (DE); Dirk Punstein, Nuremberg (DE); Christian Schulze, Nuremberg (DE); Ekkehard Toensing, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/429,043

(22) PCT Filed: Aug. 23, 2013

(86) PCT No.: PCT/EP2013/067505
§ 371 (c)(1),
(2) Date: Mar. 18, 2015

(87) PCT Pub. No.: WO2014/044484
PCT Pub. Date: Mar. 27, 2014

(65) Prior Publication Data
US 2015/0251677 A1 Sep. 10, 2015

(30) Foreign Application Priority Data

Sep. 18, 2012 (EP) .................................. 12184836
Jan. 30, 2013 (DE) ..................... 10 2013 201 494

(51) Int. Cl.
*G01M 17/03* (2006.01)
*B61L 27/00* (2006.01)
*G01M 17/08* (2006.01)

(52) U.S. Cl.
CPC ......... *B61L 27/0094* (2013.01); *G01M 17/03* (2013.01); *G01M 17/08* (2013.01)

(58) Field of Classification Search
None
See application file for complete search history.

(56) References Cited

U.S. PATENT DOCUMENTS

| | | | | |
|---|---|---|---|---|
| 5,445,347 A | * | 8/1995 | Ng ............................ | B60L 3/12 246/169 R |
| 2002/0065698 A1 | * | 5/2002 | Schick ................ | B61L 27/0094 705/7.36 |

(Continued)

FOREIGN PATENT DOCUMENTS

| | | |
|---|---|---|
| CN | 101397021 A | 4/2009 |
| DE | 19836081 A1 | 2/2000 |

(Continued)

OTHER PUBLICATIONS

Li Xi, "China Doctoral Dissertations—Research on Urban Rail", published Sep. 15, 2011.

(Continued)

*Primary Examiner* — Redhwan k Mawari
*Assistant Examiner* — Edward Torchinsky
(74) *Attorney, Agent, or Firm* — Laurence Greenberg; Werner Stemer; Ralph Locher

(57) ABSTRACT

A method and a system for diagnosing one or more rail vehicles, each of which has at least one measuring device for measuring measurement values of at least one measurement variable. The method includes the following steps: measuring measurement values by way of at least one measuring device of at least one rail vehicle; transmitting the measurement values from the rail vehicle to a control center situated along the track; evaluating the measurement values in the (Continued)

control center by means of a predefined algorithm, and providing a result of the evaluation as an output.

13 Claims, 3 Drawing Sheets

(56) References Cited

U.S. PATENT DOCUMENTS

| | | | | |
|---|---|---|---|---|
| 2010/0204857 A1* | 8/2010 | Forrest | ................ | B61L 27/0094 |
| | | | | 701/19 |
| 2013/0342362 A1* | 12/2013 | Martin | ................ | B61L 15/0027 |
| | | | | 340/870.16 |
| 2015/0247781 A1* | 9/2015 | Fischer | ............... | B61L 27/0094 |
| | | | | 702/183 |

FOREIGN PATENT DOCUMENTS

| EP | 1900597 A1 | 3/2008 |
|---|---|---|
| GB | 2450698 A | 1/2009 |
| RU | 104907 U1 | 5/2011 |
| RU | 116114 U1 | 5/2012 |

OTHER PUBLICATIONS

Zhao et al., "Network System Design for Passenger Train Running Safety Monitoring and Diagnosing System", China Academy of Railway Sciences, vol. 30, No. 5, Sep. 30, 2009—English abstract on p. 144.

Dong Ximing, "Track Train Reliability, Availability, Maintainability and Safety (RAMS)", China Railway Publishing House, Beijing 2009, Jul. 31, 2009, pp. 173-178, ISBN: 978-7-113-10221-0; 2009—English translation.

\* cited by examiner

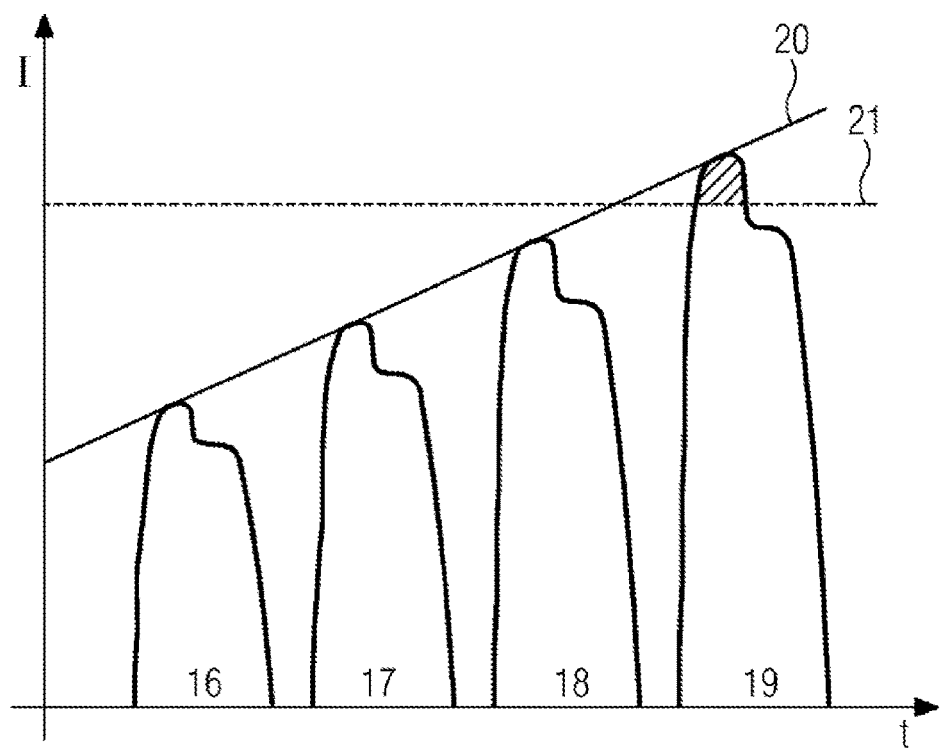

DIAGNOSTIC METHOD FOR RAIL VEHICLES

BACKGROUND OF THE INVENTION

Field of the Invention

The invention relates to a method and a system for diagnosis for an operating state of one or more rail vehicles that each comprise at least one measuring device for capturing measured values for at least one measured variable, wherein the operating state is characterized by at least one measured variable.

Rail vehicles have become known that have measuring devices on various vehicle components in order to capture measured values for a measured variable. By way of example, the traction motors of the rail vehicle have temperature sensors arranged on them in order to pick up measured values for the temperature of the traction motors. The measured values are then evaluated on board the rail vehicle by comparing each of them with a previously stipulated threshold value, for example. If a measured value from a vehicle component exceeds the threshold value, a malfunction in the vehicle component is indicated. The result of the evaluation of the measured values can also be transmitted to and output at a control center arranged on land.

BRIEF SUMMARY OF THE INVENTION

The invention is based on the object of proposing a method and a system for making precise predictions for maintenance purposes.

The object is achieved by the subjects of the independent patent claims. Developments and refinements of the invention can be found in the features of the dependent patent claims.

A method according to the invention for diagnosis for one or more rail vehicles that each comprise at least one measuring device for capturing measured values for at least one measured variable comprises the following method steps:
  measured values for at least one measured variable are captured by means of at least one measuring device of a rail vehicle,
  the measured values are transmitted from the rail vehicle to a control center arranged on the line,
  the measured values are evaluated in the control center by means of a prescribed algorithm,
  at least one result of the evaluation is provided for output by the control center.

At least one rail vehicle, particularly at least one rail vehicle for passenger transport, comprises at least one measuring device, occasionally also referred to as a measurement pickup. This is arranged particularly in or on the rail vehicle and is carried along with the rail vehicle. As a nonconclusive list of measuring devices, the following may be mentioned here: tachometers, potentiometers, moisture sensors, inclination sensors, current/voltage detection, temperature sensors and/or position sensors.

The measured values are transmitted from the rail vehicle to the control center wirelessly, for example. In this case, wireless transmission occurs at least on a section-by-section basis, i.e. the transmission does not need to be wireless over the entire path from the rail vehicle to the control center. By way of example, wireless transmission takes place by means of a remote data transmission link, such as via a GSM, UMTS or LTE network, between the rail vehicle and a transmission and reception installation in said network. Between the reception installation and the control center, the further transmission of the measured values can also be effected by wire. In a development, the measured values are transmitted from the rail vehicle to the control center in a prescribed cycle. In this case, the measured values are transmitted from the rail vehicle to the control center particularly in a manner detached from prescribed states or state changes for vehicle components of the rail vehicle. The control center is arranged on the line and hence on land and, in particular, at a fixed location and remotely from the rail vehicle.

The control center performs the evaluation of the measured values by means of a prescribed algorithm. For this purpose, the control center has particularly a controller that is suitable for evaluating the measured values by means of the prescribed algorithm. The algorithm is advantageously available as software. This has the advantage of simple and fast adjustment of the algorithm. The algorithm and measured values can be kept in a memory, as can intermediate results from the evaluation. The evaluation leads to at least one result. This at least one result is provided by the control center.

The result is transmitted to the rail vehicle, where it is output, for example visualized, in a prescribed form, and/or the result of the evaluation is output, for example visualized, on the line, particularly in the control center in a prescribed form. Alternatively, output for the customer is also possible. The result of the evaluation can also be made available via the Internet in order to resort to it from various locations. Visualization is effected as a representation on a screen, for example. Besides visualizations, audible output, tactile feedback or SMS can also be considered as further output forms. The result of an evaluation of the measured values by means of the prescribed algorithm can, as such, assume a plurality of appropriate forms. It may be a simple stop signal that is output as an audible alarm to the vehicle driver of the rail vehicle. On the other hand, it may be a diagnosis or a failure forecast for at least one vehicle component of the rail vehicle that is output to a maintenance team for the purpose of drawing up a maintenance schedule for the rail vehicle. As a further example, a life forecast may be cited here. The method is suitable for predictive maintenance, and hence suitable for making predictions about the probability of technical failure of a vehicle component and/or for scheduling appropriate maintenance intervals in order to prevent said failure.

For transmission of the result from the control center to the rail vehicle, the control center and the rail vehicle have mutually complementary transmission and reception installations. The results are then transmitted wirelessly from the control center arranged on the line to the rail vehicle, particularly on a section-by-section basis.

In addition to the possibility of locally unlimited access to the result, the provision of the result by the control center has the further advantage of temporally unlimited access. Thus, according to a further embodiment, a plurality of results from different instants are stored in the control center for a prescribed period and provided for output. This means that the memory firstly does not need to be carried along in the rail vehicle. Secondly, the output of one or more results can also be effected on the basis of events, including on the basis of the result of the evaluation itself, or on the basis of states or state changes for the rail vehicle or at least one or more vehicle components of the rail vehicle. This is also referred to as event controlled.

If the evaluation pursues the aim of establishing the immediate, certain railworthiness of the rail vehicle, for example, the result of the evaluation can be "positive" or "negative". The result itself is provided by the control center, even if it is "positive". The "positive" result is not transmitted and/or output, however; only a "negative" result is transmitted and/or output, for example as a "stop signal" for the vehicle driver. The output of at least one result and/or the transmission of at least one result from the control center to the rail vehicle can therefore be dependent on the output of the evaluation. By contrast, the measured values are transmitted from the rail vehicle to the control center in a manner detached from prescribed states or state changes for vehicle components of the rail vehicle. This is thus not event-control transmission, but rather is performed cyclically.

A further advantage of the method according to the invention is founded in that further measured values can be evaluated by means of the prescribed algorithm that are captured by means of measuring devices that are detached from the rail vehicle. These measuring devices that are detached from the rail vehicle are independent of the rail vehicle. The further measured values are therefore captured by these measuring devices independently of states or state changes for the rail vehicle or for vehicle components of the rail vehicle. These further measured values are measured values for the at least one measured variable for which the measured values from the rail vehicle are also captured, and/or the further measured values are measured values for further measured variables. Measuring devices that are detached from the rail vehicle are not carried along with the rail vehicle. However, it does not necessarily have to be a fixed measuring device, for example it is arranged on a further vehicle, particularly a rail vehicle, for example also a rail vehicle of the same design. In particular, the measuring device(s) is/are immobile measuring devices arranged on the line, however. As a result of the evaluation by means of the same algorithm, the further measured values from the independent measuring devices that are detached from the rail vehicle also have an influence on the result of the evaluation of the measured values from the measuring devices of the rail vehicle.

In this case, the further measured values from the independent measuring devices that are detached from the rail vehicle are in particular independent of the measured values that are captured by the measuring devices of the rail vehicle. The converse case does not necessarily apply. By way of example, a temperature sensor as a measuring device of the rail vehicle captures measured values for the measured variable that is the temperature of a vehicle component of the rail vehicle, e.g. of a traction motor. Temperature sensors that are free and independent of the rail vehicle, for example positioned along the line for the rail vehicle, for their part capture the temperature of the air in the surroundings of the passing rail vehicle. Thus, the temperature of the traction motor rises, influenced by the rising temperature of the air of the surroundings. By contrast, a rising temperature of the traction motor influences the temperature of the air of the surroundings only insignificantly and is therefore negligible-in this visual example, the temperature of the air of the surroundings is deemed to be independent of the temperature of the traction motor of the rail vehicle.

The further measured values that are captured by measuring devices that are independent of the rail vehicle are captured by a central location, for example, such as the weather service, and relate to the direct or indirect surroundings of the rail vehicle. In this case, by way of example, the direct surroundings of the rail vehicle also include the environment or the infrastructure, for example the condition of the line, of the rail vehicle. It is also possible to take account of vehicle-detached and vehicle-based measured values, but ones captured in a manner detached from the vehicle components of identical design. Particularly the evaluation in the control center means that this method therefore allows measured values that are not vehicle-based to be taken into account.

According to a further development of the method according to the invention, the measured values that are captured by means of the at least one measuring device of the at least one rail vehicle are evaluated in the control center by means of the prescribed algorithm, taking account of the further measured values that are captured by means of measuring devices that are independent of the rail vehicle.

The further measured values that are captured by means of measuring devices that are independent of the rail vehicle can, in addition to the measured values that are captured by means of the at least one measuring device of the at least one rail vehicle, likewise be transmitted to the control center and also have an influence on the evaluation. On the other hand, the further measured values can also be evaluated separately in a preceding method step, and only one result of this evaluation is taken into account for the evaluation of the measured values in the control center by means of the prescribed algorithm. By way of example, a plurality of further measured values accounted for measured variables for describing the weather, such as temperature, pressure or humidity, are captured. These are used to derive a weather forecast. The evaluation of the further measured values can thus lead to forecasts for temperature values that are taken into account for the evaluation of the measured values from the rail vehicle. Evaluation of the measured values from the rail vehicle in the control center by means of the prescribed algorithm is thus effected on the indirect or direct basis of the further measured values that are captured independently of the rail vehicle.

A large number of different algorithms can be used for the evaluation. Thus, according to an exemplary embodiment of the invention, the prescribed algorithm may be suitable for trend analysis for a measurement series of measured values for a prescribed measured variable. If the temperature changes over time, this can be used to predict when a prescribed limit temperature will probably be exceeded. Further algorithms are included in the following open, nonconclusive list: frequency analysis and further standard models for statistical analysis.

According to a further development of the method according to the invention, the at least one rail vehicle comprises at least one group of vehicle components of identical design, wherein measured values for at least one prescribed measured variable are captured for each of the vehicle components of identical design by means of at least one measuring device of a rail vehicle, the captured measured values are transmitted from the rail vehicle to a control center arranged on the line, the captured measured values are evaluated in the control center by means of a prescribed algorithm, and at least one result of the evaluation is provided for output by the control center.

As a simple evaluation by means of the prescribed algorithm, the measured values from the vehicle components of identical design are compared with one another in the control center. It is then possible to infer an erroneous state for one of the vehicle components of identical design if a measured value for the vehicle component differs from the other measured values from the other instances of the vehicle components of identical design at least by a prescribed amount.

The measured values for the identical vehicle components that are compared with one another are captured simultaneously, in particular.

According to a further development, a signal is output if a measured value for a vehicle component differs from the other measured values from the other instances of the vehicle components of identical design by at least the prescribed first amount. By way of example, the signal can assume the form of an audible alarm or a visual representation. By way of example, a further signal generates an appointment within a prescribed period in a maintenance appointment diary for the rail vehicle.

In order to compare the measured values from the vehicle components of identical design, the following method steps can be carried out in the control center, for example:
the measured values transmitted from the rail vehicle to the control center are stored,
intervals between the measured values are computed,
the intervals are compared with the prescribed first amount.

An erroneous state for a first vehicle component is inferred, and if need be a signal is output, if the interval between a measured value from the first vehicle component and a measured value from a further vehicle component of identical design exceeds a prescribed first amount.

Besides the simple determination of the intervals between the individual, simultaneously captured measured values from the vehicle components of identical design, a large number of further algorithms are conceivable in order to identify a discrepancy between at least one measured value and the other measured values. Examples of known algorithms for this are the determination of the individual residues for a model function obtained by means of the least square errors method, the determination of the individual discrepancies in relation to the expected value and further models for statistical analysis.

Furthermore, a plurality of amounts can be prescribed in order to draw various conclusions in the event of discrepancy and if need be to output corresponding results. Thus, a discrepancy in at least one measured value by a first amount can prompt just the indication of maintenance to be performed, whereas a discrepancy by a second amount can prompt the indication of oncoming failure of the relevant vehicle component and a warning about said failure by means of a signal.

According to a further development, at least the first amount is prescribed on the basis of further measured values for the measured variable and/or for one or more further measured variables, which further measured variables are captured by means of measuring devices that are independent of the rail vehicle and hence also independent of the operating state of the rail vehicle. The further measured values are then naturally also captured independently of the operating states of the vehicle components of identical design.

Examples of further measured variables for which measured values can be captured by the rail vehicle and/or independently of the rail vehicle are speed, rotation speed, current, voltage, temperature, pressure and/or acceleration. Corresponding measuring devices can be provided in comparable fashion. By way of example, rotation speeds and/or temperatures can be captured from motors, drives or wheels.

Measured values for at least one prescribed measured variable are captured from traction motors and/or drives of the rail vehicle, for example. In one embodiment, the rail vehicle has at least two traction motors and/or drives of identical design that have appropriate measuring devices for picking up the measured values. In an exemplary embodiment, a rail vehicle has two temperature sensors per traction motor and/or per drive. Furthermore, it can have at least one temperature sensor for capturing the ambient temperature of the rail vehicle, which temperature sensor is arranged on the outer skin of the rail vehicle, for example.

According to an exemplary illustration, the intervals between the individual measured values from the vehicle components of identical design are computed for the measured variable that characterizes the operating state of the rail vehicle. If the measured variable is the temperature and if the corresponding measured values are captured for traction motors of identical design that are each positioned at comparable locations on the rail vehicle, then the prescribed first amount is independent of an ambient temperature of the rail vehicle, since rising ambient temperature prompts all measured values for the traction motors of identical design likewise to be shifted upward. If the vehicle components of identical design are installed at very different locations in or on the rail vehicle, however, the ambient temperature can influence the measured values for the temperature of the individual vehicle components. Remote monitoring of a vehicle fleet may also have provision for the ambient temperature to be taken into account. For example, the measured values for the temperature of traction motors in a first rail vehicle may be substantially raised, given a substantially higher ambient temperature around the first rail vehicle, in comparison with a second rail vehicle, given a substantially lower ambient temperature around the second rail vehicle. In addition, measured values for other measured variables can also be taken into account. By way of example, the temperature of a vehicle component installed on the roof of the rail vehicle is essentially dependent on insolation, in contrast to a vehicle component arranged in an underfloor area but otherwise of identical design. For each measured value for the prescribed measured variable from the vehicle components of identical design, it is possible, on the basis of measured values for one or more further measured variables and/or on the basis of measured values for the same measured variable, which are captured independently of the vehicle components of identical design, for a first amount to be prescribed. The first amounts can therefore differ from one another from measured value to measured value for the prescribed measured variable from the vehicle components of identical design and/or from associated vehicle component to vehicle component.

If traction motors of identical design now each have two temperature sensors, a first temperature sensor at a first location on each traction motor and a further, second temperature sensor at a second location, which is different than the first location, on each traction motor, then exclusively the measured values from the first temperature sensors can be compared with one another and similarly the measured values from the second temperature sensors. This is not absolutely necessary, however. Equally, all measured values for the prescribed measured variable, and, as already explained above, also further measured values for the same and/or other measured variables, can be compared with one another in order to infer an erroneous state for a vehicle component, for example by comparing measured values for further measured variables with the measured values for the prescribed measured variable in order to derive the prescribed first amount therefrom.

As already explained, not only are the measured values for the identical vehicle components that are compared with one another captured simultaneously but also the measured values for the further measured variable(s) and/or the measured values for the same measured variable that are captured independently of the identical vehicle components. This does not prevent outliers for a measurement series of successive measured values from being filtered out or the measurement series from being smoothed.

The method according to the invention can be used for remote monitoring of entire vehicle fleets, for example by virtue of a fleet of rail vehicles comprising at least one group of vehicle components of identical design, wherein measured values for at least one prescribed measured variable are captured for each of the vehicle components of identical design, wherein the measured values are transmitted from the rail vehicles to the control center arranged on the line, wherein the measured values from the vehicle components of identical design are compared in the control center and wherein an erroneous state for one of the vehicle components of identical design is inferred if a measured value for a vehicle component differs from the other measured values for the other instances of the vehicle components of identical design at least by a prescribed amount. Similarly, a plurality of rail vehicles having vehicle components of identical design can also prompt the output of a signal when an erroneous state for one of the vehicle components of identical design is inferred. This can then be output on precisely the rail vehicle that comprises the vehicle component for which an erroneous state has been inferred. Besides the vehicle components of identical design across all rail vehicles, the rail vehicles in a vehicle fleet are as such also of the same design, in particular.

The central evaluation of the measured values from a plurality of rail vehicles makes it a very simple matter to stipulate an order of maintenance for the rail vehicles.

A rail vehicle, particularly in passenger transport, for carrying out the method according to the invention therefore comprises at least one measuring device for capturing measured values for at least one measured variable and at least one transmitter for transmitting the measured values from the rail vehicle to the control center. Measurement pickup is used as an equivalent term for measuring device.

By contrast, a control center for carrying out the method according to the invention comprises at least one receiver for transmitting the measured values from the rail vehicle to the control center and at least one controller for evaluating the measured values by means of a prescribed algorithm. In a development, the controller is suitable for evaluating the measured values by means of algorithms that are different than one another. By way of example, the algorithms are available as software. They are easy to replace and/or to alter. The controller is henceforth suitable for processing the further measured values that are captured by means of the further measuring devices that are independent of the rail vehicle.

At least one rail vehicle of the cited type and at least one control center of the cited type are used to form a system or an apparatus for carrying out the method according to the invention. In addition, said system may comprise at least one memory that stores the algorithms and that the controller can access. Furthermore, it may have at least one means, for example an input unit, particularly what is known as a man/machine interface, for altering the prescribed algorithm. The controller is then suitable for evaluating the measured values by means of algorithms that are different than one another. Additionally or alternatively, the controller is advantageously suitable and accordingly embodied for evaluating the measured values from the rail vehicle and the further measured values that are captured independently of the rail vehicle.

If, as in the example above, at least one rail vehicle has at least one group of vehicle components of identical design, for example two or more traction motors, where the rail vehicle comprises in each case at least one measuring device for capturing measured values for at least one prescribed measured variable for each of the vehicle components of identical design, for example if each traction motor has at least one temperature sensor for picking up measured values for the measured variable that is the temperature of the traction motor, then the control center has at least one controller that is suitable for comparing the measured values. The same naturally also applies to a system having a plurality of rail vehicles having vehicle components of identical design.

BRIEF DESCRIPTION OF THE SEVERAL VIEWS OF THE DRAWING

The invention permits numerous embodiments. It is explained in more detail with reference to the figures that follow, each of which shows an exemplary embodiment. Elements that are the same in the figures are provided with the same reference symbols.

FIG. 3 shows a trend analysis.

DESCRIPTION OF THE INVENTION

Figure 1:
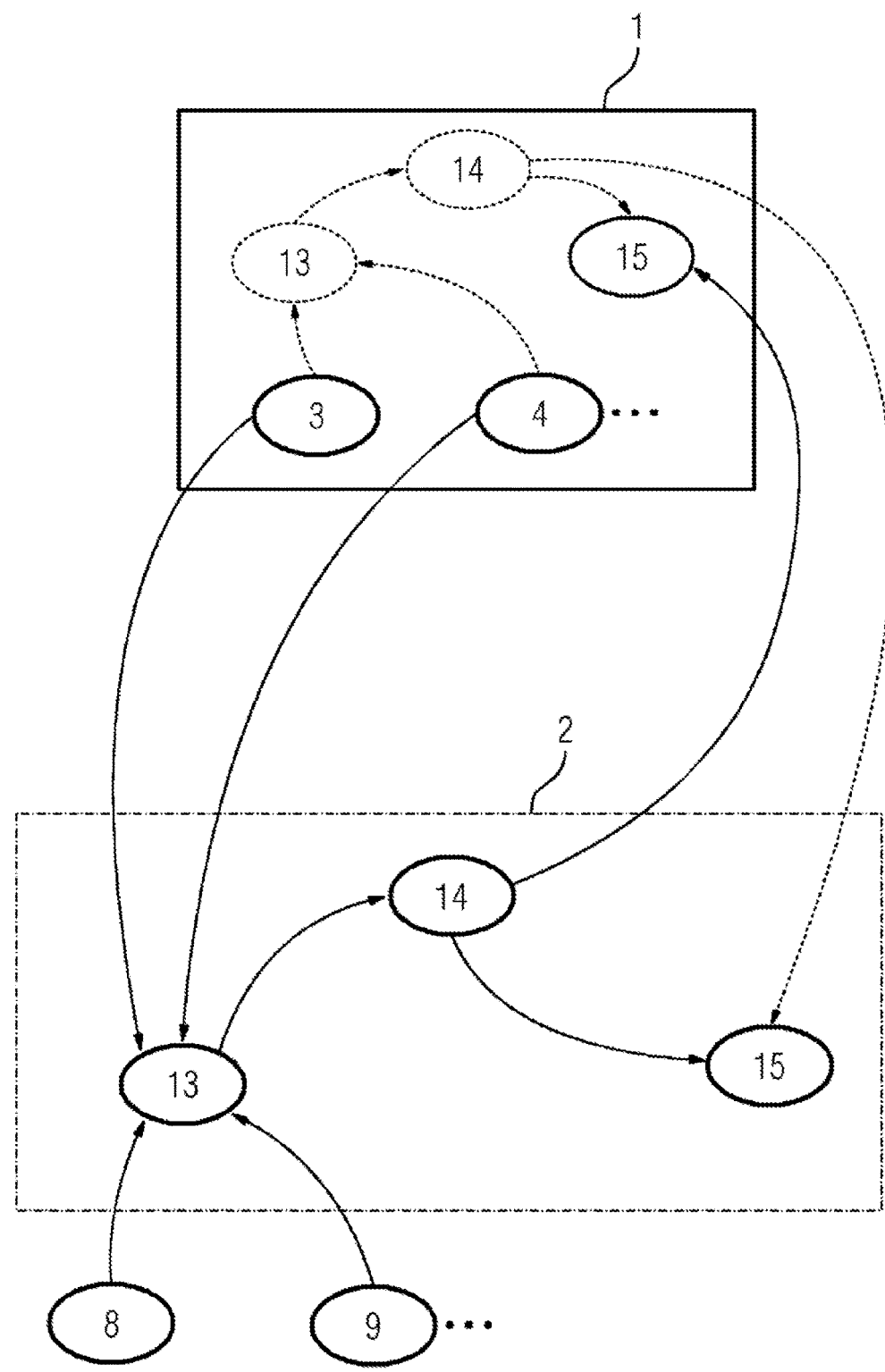
FIG. 1 schematically shows a flowchart for a method according to the invention.

FIG. 1 outlines a flowchart for a method according to the invention. A rail vehicle 1 generally comprises a plurality of measuring devices, in this case two measuring devices 3 and 4, for capturing measured values, particularly for states of vehicle components of the rail vehicle 1. In addition, the rail vehicle 1 has a transmitter—not depicted here—for transmitting the measured values. In this case, a control center 2 comprises a controller for evaluating the measured values by means of a prescribed algorithm. The evaluation by means of the prescribed algorithm is denoted by element 13 in the flowchart. In this exemplary embodiment, a result 14 of the evaluation is visualized using a screen. The output of the result is represented by element 15. The method is suitable for the remote monitoring of at least one rail vehicle, and also of a plurality of rail vehicles, for example a fleet of rail vehicles.

Solid lines denote the method according to the invention, with dotted lines denoting a method from the prior art. First of all, the measuring devices 3 and 4 of the rail vehicle 1 capture measured values for at least one measured variable. It was customary for these measured values to be evaluated on board the rail vehicle 1 in method step 13 by means of a prescribed, fixed algorithm. The result 14 of the evaluation was output on board in method step 15. In addition, the result could also be transmitted to a control center 2 and visualized there. The rail vehicle 1 then had appropriate devices, such as a suitable controller. A disadvantage is the algorithm that is difficult or impossible to alter. According to the invention, the measured values for the measuring devices 3 and 4 are not evaluated on board the rail vehicle, however, but rather are transmitted to the control center 2, in particular wirelessly at least on a section-by-section basis. In this case, the transmission is effected cyclically, for example continuously for analog transmission or discretely for preferred digital transmission. The measured values are then evaluated on the line. The algorithm for the evaluation can easily be matched to changing requirements or replaced. The result 14 of the evaluation 13 can be either routed back to the rail vehicle 1, so as to be output there, or output directly in the control center 2. The result can be output on the basis of the result and hence in event-controlled fashion. By contrast, provisioning for the output is effected cyclically in this case.

In this exemplary embodiment, further measured values that are captured by external measuring devices that are independent of the rail vehicle also have an influence on the evaluation.

Figure 2:
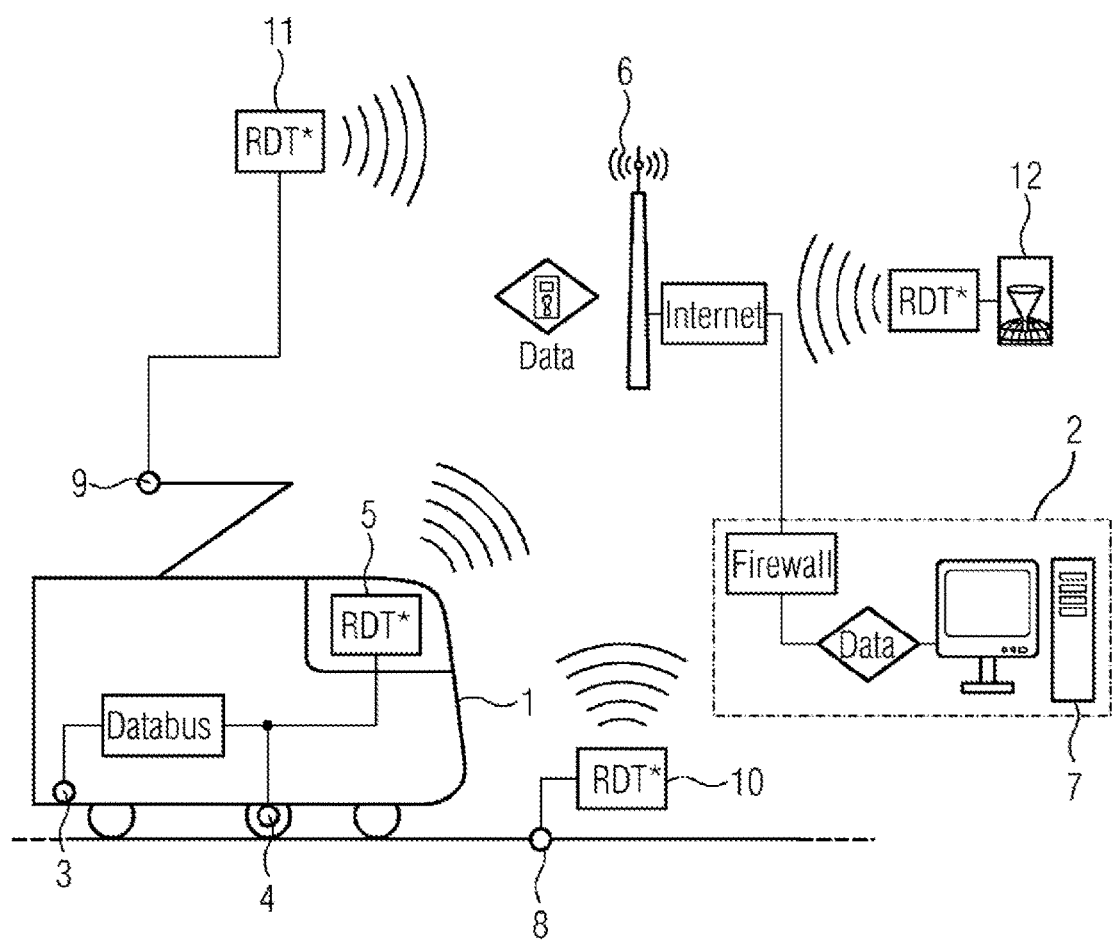
FIG. 2 schematically shows a system comprising a rail vehicle and a control center for carrying out the method according to the invention.

FIG. 2 schematically shows a system comprising a rail vehicle 1 and a control center 2. The rail vehicle 1 has vehicle components that are different or of identical design and in each case at least one measuring device 3, 4 for capturing measured values for at least one prescribed measured variable for each vehicle component, for example a temperature sensor for capturing a temperature of a traction motor and a tachometer for capturing the current speed of the rail vehicle 1. Furthermore, the rail vehicle 1 comprises a transmitter 5 for sending the measured values to the control center 2. The measured values are transmitted from the measuring devices 3, 4 to the transmitter 5 via a data bus in the rail vehicle 1.

The control center 2 in turn comprises a receiver 6 for receiving the measured values from the rail vehicle 1. The transmitter 5 and the receiver 6 are naturally compatible with one another. In this case, the receiver 6 is shown as a base station in a mobile radio network, and is arranged at a distance from the control center 2. The fixed control center 2 therefore has a multiplicity of possible receivers. In this exemplary embodiment, the measured values transmitted from the rail vehicle 1 to the receiver 6 are transmitted via the Internet from the receiver 6 to the at least one controller 7 of the control center for comparison of the measured values.

Besides the measured values for the vehicle components, captured by the measuring devices 3, 4, further measured values are taken into account by the controller 7 for the purpose of evaluating the measured values from the vehicle components, for example are correlated to said measured values.

In this case, the further measured values are captured by the infrastructure of the rail vehicle 1, particularly by the line and the overhead wire, by means of further measuring devices 8, 9 and are transmitted to the control center 2 by means of further transmitters 10, 11. All of the measured values are transmitted in encrypted form, in particular. However, further, possibly unencrypted, measured values, for example pertaining to the weather, can also have an influence on the correlation cited by way of example and can be taken into account as a result. In this case, the reference symbol 12 outlines additional measured value sources, such as a weather service. Apart from that, RDT* stands for remote date transfer.

FIG. 3 uses a graph to illustrate a simple trend analysis as an example of an algorithm for evaluating measured values. The graph plots a time characteristic for a motor current in a motor for opening and closing a door to the passenger compartment of the rail vehicle over successive door opening cycles. The measured values of the three door opening cycles 16, 17 and 18 are evaluated in the control center. A motor current characteristic 19 can be forecast for the next door opening cycle. Additionally or alternatively, a trend, represented by the straight line 20, can be computed. If a threshold value 21 has been prescribed that, when exceeded by the motor current, allows an erroneous state to be inferred for the door, the result of the trend analysis is that the motor current will probably exceed the threshold value in the next door opening cycle. This can be output as the result of the evaluation. Going on, the evaluation could advise that the door be shut down, however, in order to prevent damage, and/or could enter maintenance of the door into a maintenance schedule for the rail vehicle. Output of the result of the evaluation can also involve the door automatically being taken out of operation without any action from the personnel of the rail vehicle and/or of the control center.

The invention claimed is:

1. A diagnosis method for a rail vehicle, the rail vehicle having at least one measuring device for capturing measured values of at least one measured variable, the method comprising the following method steps:
   capturing measured values by way of the at least one measuring device of the rail vehicle;
   transmitting the measured values from a transmitter on the rail vehicle to a receiver of the control center arranged trackside;
   capturing further measured values by measuring devices that are independent of the rail vehicle;
   evaluating the measured values from the rail vehicle in a controller of the control center by way of a prescribed algorithm to form an evaluation result; and
   providing the evaluation result from the controller for output;
   wherein the evaluation of the measured values from the rail vehicle in the controller of the control center by way of the prescribed algorithm is effected based directly on the further measured values that are captured independently of the rail vehicle by the measuring devices that are independent of the rail vehicle; and
   wherein the prescribed algorithm includes a trend analysis of the measured values for predicting whether the measured values will exceed a threshold value.

2. The method according to claim 1, which comprises transmitting the evaluation result to the rail vehicle and outputting the evaluation result on the rail vehicle.

3. The method according to claim 1, which comprises outputting the evaluation result on the line.

4. The method according to claim 1, which comprises transmitting the measured values from the rail vehicle to the control center cyclically.

5. The method according to claim 1, which comprises transmitting the measured values from the rail vehicle to the trackside control center wirelessly.

6. The method according to claim 1, wherein the measured variables for which first and/or second measured values are captured are selected from the group consisting of a speed of the rail vehicle, an acceleration of the rail vehicle, a speed of a drive motor, an electric motor current, an electric voltage of a motor, and a thermodynamic temperature of a drive.

7. A system, comprising:
   at least one rail vehicle and at least one control center having at least one receiver;
   said rail vehicle having at least one measuring device for capturing measured values for at least one measured variable and at least one transmitter for transmitting the measured values from the rail vehicle to said receiver of said control center; and said control center having at least one controller for evaluating the measured values by way of a prescribed algorithm;

wherein said controller is configured for evaluating the measured values from the rail vehicle based directly on further measured values that are captured independently of the rail vehicle;

wherein said controller is configured for evaluating the measured values from the rail vehicle by way of the prescribed algorithm based directly on the further measured values that are captured independently of the rail vehicle; and wherein the prescribed algorithm includes a trend analysis of the measured values for predicting whether the measured values will exceed a threshold value.

8. The system according to claim 7, wherein said controller is configured for evaluating the measured values by way of a plurality of different prescribed algorithms.

9. The system according to claim 7, which comprises a plurality of rail vehicles having measuring devices for capturing measured values for identical measured variables, and wherein said controller is configured for evaluating the measured values by way of the prescribed algorithm in said control center.

10. The system according to claim 7, wherein said controller is configured to output an audible alarm to a driver of the rail vehicle as a result of said controller evaluating the measured values by way of the prescribed algorithm.

11. The method according to claim 1, wherein the step of providing the evaluation result from the controller for output includes outputting the evaluation result as an audible alarm to a driver of the rail vehicle.

12. The system according to claim 7, wherein said controller is configured to output an evaluation result advising that a door be shut down as a result of said controller evaluating the measured values by way of the prescribed algorithm.

13. The method according to claim 1, wherein the evaluation result advises that a door be shut down as a result of said controller evaluating the measured values by way of the prescribed algorithm.

* * * * *